(12) United States Patent
Ban et al.

(10) Patent No.: US 8,476,355 B2
(45) Date of Patent: Jul. 2, 2013

(54) LONG GLASS FIBER REINFORCED RESIN COMPOSITE AND METHOD FOR PREPARING THE SAME

(75) Inventors: Kyun Ha Ban, Uiwang-si (KR); Chang Min Hong, Uiwang-si (KR); Sung Hyo Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/339,659

(22) Filed: Dec. 29, 2011

(65) Prior Publication Data
US 2012/0190785 A1 Jul. 26, 2012

(30) Foreign Application Priority Data

Dec. 29, 2010 (KR) .................. 10-2010-0137541
Dec. 28, 2011 (KR) .................. 10-2011-0144727

(51) Int. Cl.
*C08K 3/40* (2006.01)
(52) U.S. Cl.
USPC ........................................... 524/494
(58) Field of Classification Search
USPC ........................................... 524/494
See application file for complete search history.

(56) References Cited

U.S. PATENT DOCUMENTS

| 5,514,745 | A | * | 5/1996 | Yoshino | 524/494 |
|---|---|---|---|---|---|
| 6,521,693 | B2 | * | 2/2003 | Saito et al. | 524/494 |
| 2002/0052440 | A1 | * | 5/2002 | Tochioka et al. | 524/494 |
| 2002/0156176 | A1 | * | 10/2002 | Saito et al. | 524/494 |
| 2003/0148083 | A1 | * | 8/2003 | Tanaka et al. | 428/292.1 |

* cited by examiner

*Primary Examiner* — Peter Szekely
(74) *Attorney, Agent, or Firm* — Summa, Addition & Ashe, P.A.

(57) ABSTRACT

A long glass reinforced resin composite of the present invention may comprise two kinds of thermoplastic matrix resin (a1, a2) which have different viscosities and a long glass fiber (B). The method of preparing the long glass reinforced resin composite comprises preparing a LFT (Long fiber thermoplastic) master-batch composition by impregnating the long glass fiber (B) of continuous phase into the low viscosity thermoplastic resin (a2), and compounding the LFT (Long fiber thermoplastic) master-hatch composition with high viscosity thermoplastic resin. The long glass fiber reinforced resin composite of the present invention has excellent mechanical properties such as impact strength, tensile strength, and flexural modulus.

18 Claims, 1 Drawing Sheet

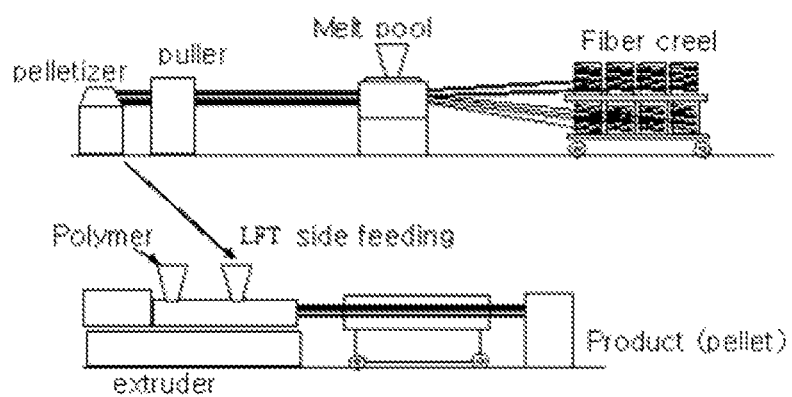

LONG GLASS FIBER REINFORCED RESIN COMPOSITE AND METHOD FOR PREPARING THE SAME

CROSS-REFERENCE TO RELATED APPLICATIONS

This application claims priority from Korea Patent Application Nos. 10-2010-0137541 filed on Dec. 29, 2010 and 10-2011-0144727 filed on Dec. 28, 2011 in the Korean Intellectual Property Office, the disclosure of which is incorporated herein by reference in its entirety.

FIELD OF THE INVENTION

The present invention relates to a long glass reinforced resin composite that can have improved mechanical properties.

BACKGROUND OF THE INVENTION

A long fiber composite is different from other composites because the long fiber used for reinforcing the composite has a longer aspect ratio than the one used in other composites. The aspect ratio is the ratio of the width of a fiber to its height.

Generally, the long fiber composite uses a long glass fiber which is impregnated in thermoplastic polymer. The long fiber composite can be prepared by various methods. One of the methods is known as pultrusion.

The long fiber composite prepared by pultrusion has been used for various applications such as automobiles, electrical/electronic devices, computers, and the like.

Japanese 1956-14311 discloses a long glass reinforced resin strand which is prepared by impregnating a melted thermoplastic resin into a bundle of long fibers to impart reinforcement, and by pulling the impregnated long fibers which are twisted by a twist roller, and then, the strand can be cut in order to make pellets.

However, most of the prior art related to pultrusion have problems such as low degree of impregnating of long fiber resulting from a matrix resin having a high viscosity, or low yield resulting from the cutting of yarn.

SUMMARY OF THE INVENTION

A long glass fiber reinforced resin composite of the present invention may comprise two kinds of thermoplastic matrix resins (a1, a2) which have different viscosities and a long glass fiber (B). The method of preparing the long glass fiber reinforced resin composite comprises preparing a LFT (Long fiber thermoplastic) master-batch composition by impregnating the long glass fiber (B) of continuous phase into the low viscosity thermoplastic resin (a2), and compounding the LFT (Long fiber thermoplastic) master-batch composition with high viscosity thermoplastic resin. The long glass fiber reinforced resin composite of the present invention has excellent mechanical properties such as impact strength, tensile strength, and flexural modulus.

BRIEF DESCRIPTION OF THE DRAWING

FIG. 1 represents an extruder which is used for preparing the long glass fiber reinforced resin composite of the present invention.

DETAILED DESCRIPTION OF THE INVENTION

The present invention will be described more fully hereinafter.

Long Glass Fiber Reinforced Resin Composite (A) Thermoplastic Matrix Resin

A long glass fiber reinforced resin composite of the present invention may comprise two kinds of thermoplastic matrix resins which have different viscosities, wherein the two kinds of thermoplastic matrix resins comprise a high-viscosity thermoplastic resin (a1) and low-viscosity thermoplastic resin (a2) impregnating a long glass fiber. Thermoplastic resins may be used as thermoplastic resins (a1) and (a2) without limitation. However, regarding the thermoplastic resins (a1) and (a2), it is desirable to use the same kind of thermoplastic resin, except for the viscosity.

A melt flow index of the high viscosity thermoplastic resin (a1) is less than about 30 g/10 min, preferably 1 to 30 g/10 min, more preferably about 5 to 30 g/10 min in accordance with ASTM 1238.

A melt flow index of the low viscosity thermoplastic resin (a2) is 50 to 200 g/10 min, preferably about 60 to 150 g/10 min in accordance with ASTM 1238.

Polyamide resin, polycarbonate resin, or polyethylene terephthalate resin can be used as the thermoplastic resins (a1) and (a2), however, it is desirable to use a polyamide resin such as nylon 6 or nylon 6,6.

In an exemplary embodiment of the present invention, the thermoplastic resin can be described as follows.

Polyamide Resin

In the present invention, aromatic polyamide resin is prepared by condensation polymerizing an aromatic dicarboxylic acid containing about 10 to 100 mol % of dicarboxylic acid which has a benzene ring in a main chain and monomers of aliphatic or alicyclic diamine.

Particularly, the aromatic dicarboxylic acid may comprise terephthalic acid and isophthalic acid which is independently represented by the following chemical formulas 1 and 2, and chemical formulas 1 and 2 show the benzene ring fixed in a main chain. The carbon number of the aliphatic or alicyclic diamine is 4 to 20.

[Chemical Formula 1]

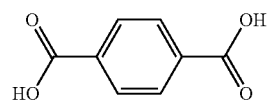

terephthalic acid, TPA

[Chemical Formula 2]

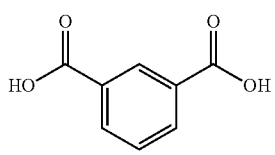

isophthalic acid, IPA

In exemplary embodiments, a typical aromatic polyamide is prepared by condensation polymerizing a hexamethylene diamine and terephthalic acid, is referred to as PA6T, and is represented as Chemical Formula 3.

[Chemical Formula 3]

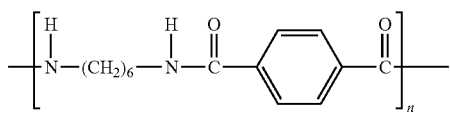

(Wherein n is an integer between 50 and 500)

The aromatic polyamide of the present invention has a melting point more than about 150☐ and is a compound which has a benzene ring in a main chain, such as polytetramethylene adipamide (PA 46), polycaproamide/polyhexamethylene terephthalamide copolymer (PA 6/6T), polyhexamethylene adipamide/polyhexamethylene terephthalamide copolymer (PA 66/6T), polyhexamethylene adipamide/polyhexamethylene isophthalamide copolymer (PA66/6I), polyhexamethylene terephthalamide/polyhexamethylene isophthalamide copolymer (PA6T/6I), polyhexamethylene terephthalamide/polydodecanamide copolymer (PA 6T/12), polyhexamethylene adipamide/polyhexamethylene terephthalamide/polyhexamethylene isophthalamide copolymer (PA 66/6T/6I), polyxylylene adipamide (PA MXD6), polyhexamethylene terephthalamide/poly 2-methylpentamethylene terephthalamide copolymer (PA 6T/M5T), Nylon 10T/1012, polyhexamethylene terephthalamide (PA6T), polynonamethylene terephthalamide (PA9T), polyhexamethylene terephthalamide (PA10T), polyamide 11T (PA 11T), polyamide 12T (PA 12T), and combinations thereof.

Polycarbonate Resin

A polycarbonate resin can be prepared by a method which is known to a skilled artisan, or can be one which can be purchased commercially without limitation.

Exemplary polycarbonate resins can be prepared by reacting a diphenol represented by the below Chemical Formula 4 and phosgene, halogen formate, or carbonic diester.

[Chemical Formula 4]

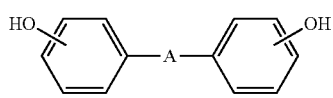

(A is a single bond, C1 to C5 alkylene, C1 to C5 alkenylene, C5 to C6 cycloalkenylene, S, or SO2)

The diphenols represented by the above Chemical Formula 4 may be used singly or in combinations to constitute repeating units of the polycarbonate resin. Exemplary diphenols include without limitation hydroquinone, resorcinol, 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and combinations thereof.

In exemplary embodiments, the diphenol can include 2,2-bis(4-hydroxyphenyl)-propane, 2,2-bis(3,5-dichloro-4-hydroxyphenyl)-propane, or 1,1-bis(4-hydroxyphenyl)-cyclohexane. In other exemplary embodiments, the diphenol can include 2,2-bis(4-hydroxyphenyl)-propane.

In exemplary embodiments, the polycarbonate resin can have a weight average molecular weight ranging from about 10,000 to about 200,000 g/mol, for example about 15,000 to about 80,000 g/mol, but the molecular weight of the polycarbonate is not limited thereto.

The polycarbonate resin may include without limitation a linear polycarbonate resin or a branched polycarbonate resin. The branched polycarbonate resin may be prepared by reacting a multi-functional aromatic compound with diphenols and a carbonate. The multi-functional aromatic compound may be included in an amount of 0.05 to 2 mol % based on the total weight of the branched polycarbonate resin.

The polycarbonate resin may include without limitation a homo polycarbonate, copolycarbonate, or combinations thereof Further, the polycarbonate which is used for preparing the resin composition of the present invention can be partially or completely substituted with an ester precursor such as an aromatic polyester-carbonate resin which is acquired from the polymerization of a difunctional carboxylic acid.

Polyethylene Terephtalate Resin

A polyethylene terephthalate (PET) resin of the present invention can be prepared by polymerization of dicarboxylic acid and diol.

Examples of dicarboxylic acid include terephthalic acid, isophthalic acid, naphthalene dicarboxylic acid, diphenyl ether dicarboxylic acid, diphenyl dicarboxylic acid, diphenyl sulfone dicarboxylic acid, and the like. Examples of diol include α-ω-diol such as ethylene glycol, trimethylene glycol, tetramethylene glycol, hexamethylene glycol, neopentyl glycol, cyclohexane dimethylol, 2,2 bis (4-β-hydroxy-phenyl-phenyl)-propane, 4,4-bis-(β-hydroxy-epoxy)-diphenyl sulfone, diethylene glycol, and the like.

The PET resin composition can include a PET resin in an amount of about 10 to 90% by weight based on 100% by weight of the total resin composition.

The high viscosity thermoplastic resin (a1) can be used in an amount of 10 to 90% by weight, based on about 100% by weight of the long glass fiber reinforced resin composite of the present invention.

(B) Long Glass Fiber

A long glass fiber of the present invention is a glass composition which can be formed as a fiber such as "E-glass", "A-glass", "C-glass", "D-glass", "R-glass", "S-glass" or E glass derivatives which do not have fluorine or/and boron.

Most glass fibers used as a reinforcing agent are prepared by E-glass, and the method of preparing a glass filament from glass fibers is well known to a skilled artisan.

The long glass fiber (B) of the present invention has a nominal filament diameter in a range of about 4 to 35 μm, preferably about 9 to 35 μm.

If the long glass fiber is directly compounded with high viscosity thermoplastic resin, the long glass fiber may be cut or damaged resulting from the shear stress which is transmitted from high viscosity resin.

The present invention introduces the master batch composition comprising the long glass fiber (B) and the low viscosity thermoplastic resin (a2) to prevent the cutting or damage to the glass fiber, and to maintain the excellent mechanical properties of the glass fiber and mechanical reinforcement of thermoplastic resin. Then, the long glass fiber resin composite is prepared by compounding the master batch composition with the high viscosity thermoplastic resin (a1).

The long glass fiber (B) is included in an amount of about 30 to about 70% by weight, based on 100% by weight of the low viscosity thermoplastic resin (a2) and the long glass fiber (B).

The low viscosity thermoplastic resin (a2) impregnating the long glass fiber (B) is included in an amount of about 10 to 90% by weight based on 100% by weight of the long glass fiber reinforced resin composite.

The Method of Preparing the Long Glass Fiber Reinforced Resin Composite

Whereas the prior art prepares a long glass fiber composite by injection, the present invention provides a method comprising the first step of preparing the master batch composition of the long glass fiber and low viscosity thermoplastic resin and the second step of compounding the master batch composition with high viscosity thermoplastic resin. The long glass fiber reinforced thermoplastic resin composite of the present invention has both excellent mechanical properties of the long glass fiber composite and mechanical reinforcement of thermoplastic resin.

Step 1: Preparing the LFT (Long Fiber Thermoplastic) Master-Batch Composition

The LFT (Long fiber thermoplastic) master-batch composition is prepared by a pultrusion process, i.e., impregnating the long glass fiber (B) of continuous phase into the low viscosity thermoplastic resin (a2). The pultrusion process is a method which is well known to a skilled artisan.

Step 2: Compounding the LFT (Long Fiber Thermoplastic) Master-Batch Composition with High Viscosity Thermoplastic Resin The LFT (Long fiber thermoplastic) master-batch composition prepared by the above step 1 is compounded with high viscosity thermoplastic resin. It is desirable to use the LFT master-batch composition in the form of pellets in order to obtain good dispersibility and to maintain the original properties of the matrix resin.

In the method of preparing the long glass fiber reinforced resin composite of the above steps 1 to 2, the cutting or damage of the long glass fiber can be decreased so that the long glass fiber reinforced resin composite can have excellent mechanical properties.

Particularly, a molded article which is prepared from the long glass fiber reinforced resin composite may include a long glass fiber of about 5 to 20 mm length as more than 90% by weight based on 100% by weight of total glass fiber. The number of long glass fibers having a length of about 5 to 20 mm is measured by calculating an arithmetic mean of the length of 100 glass fibers selected from the residual glass fibers in the molded article maintained for 1 hour under the condition of a temperature 550° C.

The long glass fiber reinforced resin composite of the present invention includes a lot of the long glass fibers of about 5 to 20 mm length so that it can have excellent mechanical properties. In some exemplary embodiments of the present invention, the long glass fiber reinforced resin composite can have an impact strength (IZOD, ⅛") measured in accordance with ASTM D256 of more than about 16 kgf·cm/cm, a tensile strength measured in accordance with ASTM D638 of more than about 1,400 kg/cm², a flexural modulus measured in accordance with ASTM D790 of more than about 80,000 kg/cm², a flexural modulus measured in accordance with ASTM D790 of more than about 1,900 kg/cm², and a melt flow index measured in accordance with ASTM D1238 of about 10 to about 30 g/10 min.

The invention may be better understood by reference to the following examples which are intended for the purpose of illustration and are not to be construed as in any way limiting the scope of the present invention, which is defined in the claims appended hereto.

EXAMPLES

Specifications of each component used in the following examples and comparative examples are as follows (unit:% by weight).

(1) Polyamide Resin (a1) High Viscosity Thermoplastic Resin:

A high viscosity thermoplastic resin (product name: Radilon A HS 164 (nylon 6,6)) having a melt flow index of 15 g/10 min is used.

(a2) Low Viscosity Thermoplastic Resin:

A low viscosity thermoplastic resin (product name: Radilon A HS 164 (nylon 6,6)) having a melt flow index of 67 g/10 min is used.

(2) Polycarbonate Resin (a1) High Viscosity Thermoplastic Resin:

A high viscosity thermoplastic resin made by Teijin Company (product name: L1225Y) having a melt flow index of 26 g/10 min is used.

(a2) Low Viscosity Thermoplastic Resin:

A low viscosity thermoplastic resin made by Teijin Company (product name: L1225Y) having a melt flow index of 70 g/10 min is used.

(3) Poly Ethylene Terephthalate Resin (a1) High Viscosity Thermoplastic Resin:

A high viscosity thermoplastic resin made by Eastman Company (product name: Easter EN067) having a melt flow index of 15 g/10 min is used.

(a2) Low Viscosity Thermoplastic Resin:

A low viscosity thermoplastic resin made by Eastman Company (product name: Easter GN119) having a melt flow index of 86 g/10 min is used.

(4) A Long Glass Fiber Made by Owens Corning Company (Product Name: E1200) is used.

(5) A Short Glass Fiber of 4 to 6 mm Length is used.

Examples 1 to 8

The compositions as shown in Table 1 are added to a conventional twin-screw extruder (model SM plat TEK45). A thermoplastic matrix resin is fed into a main hopper of the twin-screw extruder, whereas a master-batch composition impregnating a long glass which is prepared in the shape of pellets, namely, the LFT pellets are fed into the twin-screw extruder as a side feeding. A high viscosity thermoplastic resin of matrix resin used is the same kind as the low viscosity thermoplastic resin of the LFT master batch composition. Then, the long glass fiber reinforced composite is acquired as pellets of 12 mm length. The test specimen is prepared by molding the 12 mm length pellets using the JSW injection molding machine (model J180AD-180H) which is represented as FIG. 1, and the physical properties of the test specimens are measured.

Comparative Examples 1 and 2

Compositions of Comparative Examples 1 and 2 are prepared in the same manner as the Examples except for using a short glass fiber and the components of the Comparative Examples are simply compounded without preparing a master batch composition as shown in Table 1.

Methods for Measuring Properties

Properties of the resin compositions prepared by the above methods are measured by the following methods, and the results thereof are set forth in Table 1.

(1) Impact Strength: notch izod impact strength (kgf·cm/cm) of a specimen with a thickness of ⅛ inch is measured in accordance with ASTM D256, wherein impact strength is calculated by the arithmetic means of examples excepting for both of minimum and maximum value of impact strength in examples.

(2) Tensile Strength (kg/cm²): tensile strength is measured in accordance with ASTM D638.

(3) Flexural Strength (kg/cm²): flexural strength is measured in accordance with ASTM D790.

(4) Flexural Modulus (kg/cm²): flexural strength is measured in accordance with ASTM D790.

(5) A number of the long glass fibers of 5 to 20 mm length (under the condition of loss of ignition):

In a molded article which is prepared using the compositions set forth below in Table 1, the number of long glass fiber having a length of about 5 to 20 mm is measured by calculating an arithmetic mean of the length of 100 glass fibers selected from the residual glass fibers in the molded article maintained for 1 hour under the condition of a temperature 550° C.

TABLE 1

| | | Examples | | | | | | | | Comp. Ex. | |
|---|---|---|---|---|---|---|---|---|---|---|---|
| | | 1 | 2 | 3 | 4 | 5 | 6 | 7 | 8 | 1 | 2 |
| (a1) | Polyamide resin | 75 | 50 | 25 | 50 | — | — | 20 | — | 20 | — |
| | Polycarbonate resin | — | — | — | — | 50 | — | — | — | — | — |
| | PET resin | — | — | — | — | — | 50 | — | 20 | — | 20 |
| Master-batch composition(LFT) | | 25 | 50 | 75 | 50 | 50 | 50 | 80 | 80 | — | — |
| Short glass fiber | | — | — | — | — | — | — | — | — | 80 | 80 |
| Impact Strength (⅛", kg · cm/cm) | | 14.2 | 19.8 | 21.3 | 22.3 | 18.7 | 15.89 | 15.1 | 17.2 | 7.4 | 10 |
| Tensile Strength (kg/cm²): | | 1420 | 1899 | 1920 | 2140 | 1530 | 1493 | 1814 | 1597 | 1597 | 1357 |
| Flexural Strength (kg/cm²): | | 2020 | 2664 | 2810 | 3103 | 2150 | 1934 | 2510 | 2308 | 2308 | 2034 |
| Flexural Modulus (kg/cm²): | | 84 | 149 | 167 | 160 | 157 | 113 | 149 | 129 | 129 | 107 |
| Number of long glass fibers of 5 to 20 mm length | | 90 | 92 | 94 | 91 | 96 | 91 | 93 | 3 | 3 | 2 |

As shown in Table 1, examples 1 to 8 are long glass fiber reinforced resin composites comprising a matrix resin selected from polyamide, polycarbonate, or PET and a master-batch composition which includes a low viscosity thermoplastic resin and impregnated long glass fiber in an amount shown in Table 1.

From the results in Table 1, it can be seen that the examples including long glass fibers having a length of 5 to 20 mm have better properties than the comparative examples in which short glass fibers are simply compounded with a high viscosity thermoplastic matrix resin.

As compared with the comparative examples, the examples 1 to 8 of the present invention show remarkably improved impact strength, tensile strength, flexural strength, and flexural modulus.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A long glass fiber reinforced resin composite comprising;
   (A) a thermoplastic matrix resin selected from the group consisting of polyamide resins, polycarbonate resins, polyethylene terephthalate resins, and combinations thereof; and
   (B) long glass fibers impregnated in the thermoplastic matrix resin (A),
   wherein said long glass fibers (B) have a length of about 5 to about 20 mm and comprise more than 90% by weight of the total weight of glass fibers impregnated in the thermoplastic matrix resin (A).

2. The long glass fiber reinforced resin composite of claim 1, wherein said thermoplastic matrix resin comprises a thermoplastic resin (a1) and a thermoplastic resin (a2), wherein thermoplastic resin (a1) has a higher viscosity than the thermoplastic resin (a2).

3. The long glass fiber reinforced resin composite of claim 2, wherein said long glass fiber (B) is impregnated in the thermoplastic resin (a2).

4. The long glass fiber reinforced resin composite of claim 3, wherein said long glass fiber reinforced resin composite comprises about 10 to 90% by weight of the thermoplastic resin (a1) and about 10 to 90% by weight of the long glass fiber (B) impregnated thermoplastic resin (a2).

5. The long glass fiber reinforced resin composite of claim 4, wherein said long glass fiber (B) is included in an amount of about 30 to about 70% by weight based on 100% by weight of the long glass fiber (B) impregnated thermoplastic resin (a2).

6. The long glass fiber reinforced resin composite of claim 1, wherein said polyamide resin is nylon 6 or nylon 6,6.

7. The long glass fiber reinforced resin composite of claim 2, wherein said thermoplastic resin (a1) has a melt flow index of about 5 to 30 g/10 min measured in accordance with ASTM 1238.

8. The long glass fiber reinforced resin composite of claim 2, wherein said thermoplastic resin (a1) has a melt flow index of about 60 to 150 g/10 min measured in accordance with ASTM 1238.

9. The long glass fiber reinforced resin composite of claim 1, wherein said long glass fiber reinforced composite has an impact strength (IZOD, ⅛") of more than about 16 kgf·cm/cm measured in accordance with ASTM D256.

10. The long glass fiber reinforced resin composite of claim 1, wherein said long glass fiber reinforced composite has a tensile strength measured in accordance with ASTM D638 of more than about 1,400 kg/cm², a flexural modulus measured in accordance with ASTM D790 of more than about 80,000 kg/cm², a flexural modulus measured in accordance with ASTM D790 of more than about 1,900 kg/cm², and a melt flow index measured in accordance with ASTM D1238 of about 10 to about 30 g/10 min.

11. A method for preparing a long glass fiber reinforced resin composite comprising:
   a first step of preparing a long fiber thermoplastic (LFT) master-batch composition including a thermoplastic resin (a2) by a pultrusion process; and a second step of compounding the LFT master-batch composition with a thermoplastic resin (a1), wherein the thermoplastic resin (a1) has a higher viscosity than the thermoplastic resin (a2), and wherein the thermoplastic resin (a1) and the thermoplastic resin (a2) are selected from the group consisting of polyamide resins, polycarbonate resins, polyethylene terephthalate resins, and combinations thereof.

12. The method for preparing a long glass fiber reinforced resin composite of claim 11, wherein said LFT master-batch composition is compounded into the thermoplastic resin as pellets.

13. The method for preparing a long glass fiber reinforced resin composite of claim 11, wherein the first step of preparing a LFT master-batch composition by a pultrusion process comprises impregnating long glass fibers (B) in thermoplastic resin (a2) in an amount of about 30 to about 70% by weight based on 100% by weight of the LFT master-batch composition.

14. The method for preparing a long glass fiber reinforced resin composite of claim 11, wherein said second step comprises compounding about 10 to about 90% by weight of the LFT master-batch composition with about 10 to about 90% by weight of the thermoplastic resin (a1).

15. The method for preparing a long glass fiber reinforced resin composite of claim 11, wherein said thermoplastic resin (a1) has a melt flow index of about 5 to 30 g/10 min measured in accordance with ASTM 1238.

16. The method for preparing a long glass fiber reinforced resin composite of claim 13, wherein said thermoplastic resin (a2) has melt flow index of about 60 to 150 g/10 min measured in accordance with ASTM 1238.

17. A long glass fiber reinforced resin composite prepared by the method of claim 11.

18. The long glass fiber reinforced resin composite of claim 17, wherein said long glass fiber reinforced resin composite includes long glass fibers having a length of about 5 to 20 mm in an amount of more than 90% by weight based on the total weight of glass fibers.

* * * * *